US012116958B2

(12) United States Patent
Powell et al.

(10) Patent No.: US 12,116,958 B2
(45) Date of Patent: Oct. 15, 2024

(54) ROCKET MOTOR AND COMPONENTS THEREOF

(71) Applicant: Dawn Aerospace Limited, Christchurch (NZ)

(72) Inventors: Stefan Johannes Powell, Christchurch (NZ); Tobias René Knop, Delft (NL); James Robert Powell, Christchurch (NZ); Robert Mark Werner, Christchurch (NZ); Jeroen Wink, Delft (NL)

(73) Assignee: Dawn Aerospace Limited, Middleton (NZ)

( * ) Notice: Subject to any disclaimer, the term of this patent is extended or adjusted under 35 U.S.C. 154(b) by 0 days.

(21) Appl. No.: 17/394,768

(22) Filed: Aug. 5, 2021

(65) Prior Publication Data

US 2022/0112867 A1   Apr. 14, 2022

Related U.S. Application Data

(60) Provisional application No. 63/061,959, filed on Aug. 6, 2020.

(51) Int. Cl.
*F02K 9/52* (2006.01)
*F02K 9/42* (2006.01)
(Continued)

(52) U.S. Cl.
CPC ............... *F02K 9/52* (2013.01); *F02K 9/42* (2013.01); *F02K 9/44* (2013.01); *F02K 9/50* (2013.01);
(Continued)

(58) Field of Classification Search
CPC ..... F02K 9/42; F02K 9/44; F02K 9/50; F02K 9/52; F02K 9/56; F02K 9/58; F02K 9/64; F02K 9/972

See application file for complete search history.

(56) References Cited

U.S. PATENT DOCUMENTS 2,719,584 A * 10/1955 Winslow ............... F02K 9/52
239/545
3,001,365 A *  9/1961 Kellogg ............... F02K 9/52
60/39.461
(Continued)

FOREIGN PATENT DOCUMENTS

CN  101644627 A   2/2010
CN  103089488     5/2013

OTHER PUBLICATIONS

Collard et al. "Pressurized Xenon Propellant Management System for the CubeSat Ambipolar Thruster." Joint Conf. of 30th International Symposium on Space Technology and Science. (2015), pp. 1-10.

(Continued)

*Primary Examiner* — William H Rodriguez
(74) *Attorney, Agent, or Firm* — Merchant & Gould P.C.

(57) ABSTRACT

A rocket motor and rocket motor feed system are disclosed. The rocket motor feed system includes a sonic choke which passively regulates the mass flow rate of gaseous propellant passing through the sonic choke. An injector is provided and isolates the upstream feed line of the rocket motor feed system from a combustor. Regenerative cooling circuits are disclosed. Self-pressurised gaseous propellants may be used with the rocket motor and rocket motor feed system. Suitable propellants are disclosed. Bi-propellants may be used. The sonic choke may provide a ratio of oxidiser:fuel to a combustor. Rocket motor feed systems with separate fuel and oxidiser branches are also disclosed. A rocket motor utilising such a feed system is disclosed.

15 Claims, 7 Drawing Sheets

(51) Int. Cl.
*F02K 9/44* (2006.01)
*F02K 9/50* (2006.01)
*F02K 9/56* (2006.01)
*F02K 9/58* (2006.01)
*F02K 9/64* (2006.01)

(52) U.S. Cl.
CPC ............... *F02K 9/56* (2013.01); *F02K 9/58* (2013.01); *F02K 9/64* (2013.01)

(56) References Cited

U.S. PATENT DOCUMENTS

| | | | | |
|---|---|---|---|---|
| 3,088,406 | A * | 5/1963 | Horner | F02K 9/44 60/225 |
| 3,166,900 | A * | 1/1965 | Stegen | F02K 9/58 60/773 |
| 3,172,254 | A * | 3/1965 | Wright | F02K 9/56 60/39.27 |
| 3,368,353 | A * | 2/1968 | Allport | F02K 9/56 60/257 |
| 3,453,827 | A * | 7/1969 | Vogt | F02K 9/50 60/773 |
| 3,581,495 | A * | 6/1971 | Kah, Jr. | F02K 9/52 60/742 |
| 3,848,806 | A | 11/1974 | Samuelsen et al. | |
| 5,063,734 | A * | 11/1991 | Morris | F02K 9/56 60/204 |
| 5,148,674 | A * | 9/1992 | Morris | F02K 9/56 60/39.27 |
| 6,193,187 | B1 * | 2/2001 | Scott | F02K 7/10 244/171.1 |
| 6,205,770 | B1 * | 3/2001 | Williams | F02K 9/62 60/204 |
| 6,250,602 | B1 | 6/2001 | Jansen | |
| 6,783,108 | B2 | 8/2004 | Jansen | |
| 7,784,269 | B1 * | 8/2010 | Greason | F02K 9/64 60/260 |
| 8,250,853 | B1 * | 8/2012 | Pinera | F02K 9/48 60/246 |
| 8,572,948 | B1 * | 11/2013 | Pinera | F02K 9/48 60/221 |
| 2004/0118103 | A1 * | 6/2004 | Nagashima | F02K 9/425 60/200.1 |
| 2004/0148923 | A1 * | 8/2004 | Hewitt | F02K 9/972 60/257 |
| 2004/0177603 | A1 * | 9/2004 | Hewitt | F02K 9/972 60/205 |
| 2008/0016846 | A1 * | 1/2008 | Spadaccini | F02K 1/64 60/267 |
| 2008/0264035 | A1 * | 10/2008 | Ricciardo | F02K 9/64 60/206 |
| 2009/0120060 | A1 * | 5/2009 | Coste | F02K 9/58 60/257 |
| 2009/0288390 | A1 * | 11/2009 | Pavia | F02K 9/64 60/267 |
| 2010/0170222 | A1 * | 7/2010 | Rogers | F02K 9/58 700/285 |
| 2010/0257839 | A1 * | 10/2010 | Watkins | F02K 9/48 60/204 |
| 2010/0300065 | A1 * | 12/2010 | Balepin | F02K 9/46 60/266 |
| 2013/0175968 | A1 * | 7/2013 | Lee | F02K 9/56 318/560 |
| 2013/0340407 | A1 * | 12/2013 | Fisher | F02K 9/82 60/200.1 |
| 2017/0096967 | A1 * | 4/2017 | Bostwick | F02K 9/566 |
| 2018/0171933 | A1 * | 6/2018 | Besnard | F02K 9/50 |
| 2020/0240365 | A1 * | 7/2020 | Elzein | F02K 9/972 |
| 2022/0099028 | A1 * | 3/2022 | Palmer | F02C 7/18 |

OTHER PUBLICATIONS

Wang et al. "Study on the High-Pressure Gas Flow Measurement System of Orifice Used in Rocket." J. of Physics Series 1065, (2018), pp. 1-5.

* cited by examiner

ROCKET MOTOR AND COMPONENTS THEREOF

CROSS-REFERENCE TO RELATED PATENT APPLICATIONS

This application claims priority to, and the benefit of, U.S. Provisional Application No. 63/061,959, filed Aug. 6, 2020, which is incorporated by reference herein in its entirety.

FIELD

This invention relates to a rocket motor and components thereof.

BACKGROUND

Rocket motors can require a motor feed system which delivers a mass flow rate of propellant. Rocket motor feed systems may use active feed systems with pumps or blowdown systems to provide a specified mass flow rate of propellant. Active feed systems can be complex and expensive.

SUMMARY

In some configurations, a rocket motor feed system can comprise a feed line supplying a gas from a gas supply; a sonic choke provided in the feed line, the sonic choke being configured to passively regulate the mass flow rate of gas passing therethrough; and an injector provided in the feedline, the injector being downstream of the sonic choke, wherein the injector is configured to at least substantially isolate the upstream feed line from a downstream combustor.

In some configurations, the gas supplied from the gas supply can be a gaseous propellant.

In some configurations, the gas can be a fuel.

In some configurations, the gas can be propene, propane, methane, ethane, ethene or hydrazine.

In some configurations, the gas can be an oxidiser.

In some configurations, the gas can be nitrous oxide, nitrogen tetroxide, or liquid oxygen.

In some configurations, the gas supplied from the gas supply can be self-pressurised.

In some configurations, the gas supplied from the gas supply can be the vapour phase of a liquified gas.

In some configurations, the gas supplied from the gas supply can have a pressure of at least 5 bar across a range of operating temperatures.

In some configurations, the range of operating temperatures can include −10° C. to 35° C.

In some configurations, the sonic choke can define a cylindrical orifice.

In some configurations, the cylindrical orifice can have a diameter of 50 to 10000 microns.

In some configurations, the cylindrical orifice can have a length:diameter ratio of 1 to 10.

In some configurations, the sonic choke can provide a mass flow rate of 0.1-1 kilogram/second.

In some configurations, the rocket motor feed system can include a combustor downstream of the injector.

In some configurations, the rocket motor feed system can include a regenerative cooling circuit.

In some configurations, the rocket motor feed system can include a second feed line supplying a gas from a second supply; a second sonic choke provided in the second feed line, the second sonic choke being configured to passively regulate the mass flow rate of gas passing therethrough; wherein the injector is configured to at least substantially isolate the upstream second feed line from a downstream combustor.

In some configurations, the first feed line can be a fuel branch and the second feed line can be an oxidiser branch.

In some configurations, the rocket motor feed system can include a regenerative cooling circuit provided in the first and/or second feed line.

In some configurations, the rocket motor feed system can provide an oxidiser:fuel ratio between 0.5 to 20.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate examples of the invention and, together with the general description of the invention given above, and the detailed description of examples given below, serve to explain the principles of the invention, in which:

FIG. 6(*b*) depicts a cross-sectional view of an example of an injector.

DETAILED DESCRIPTION

Figure 1:
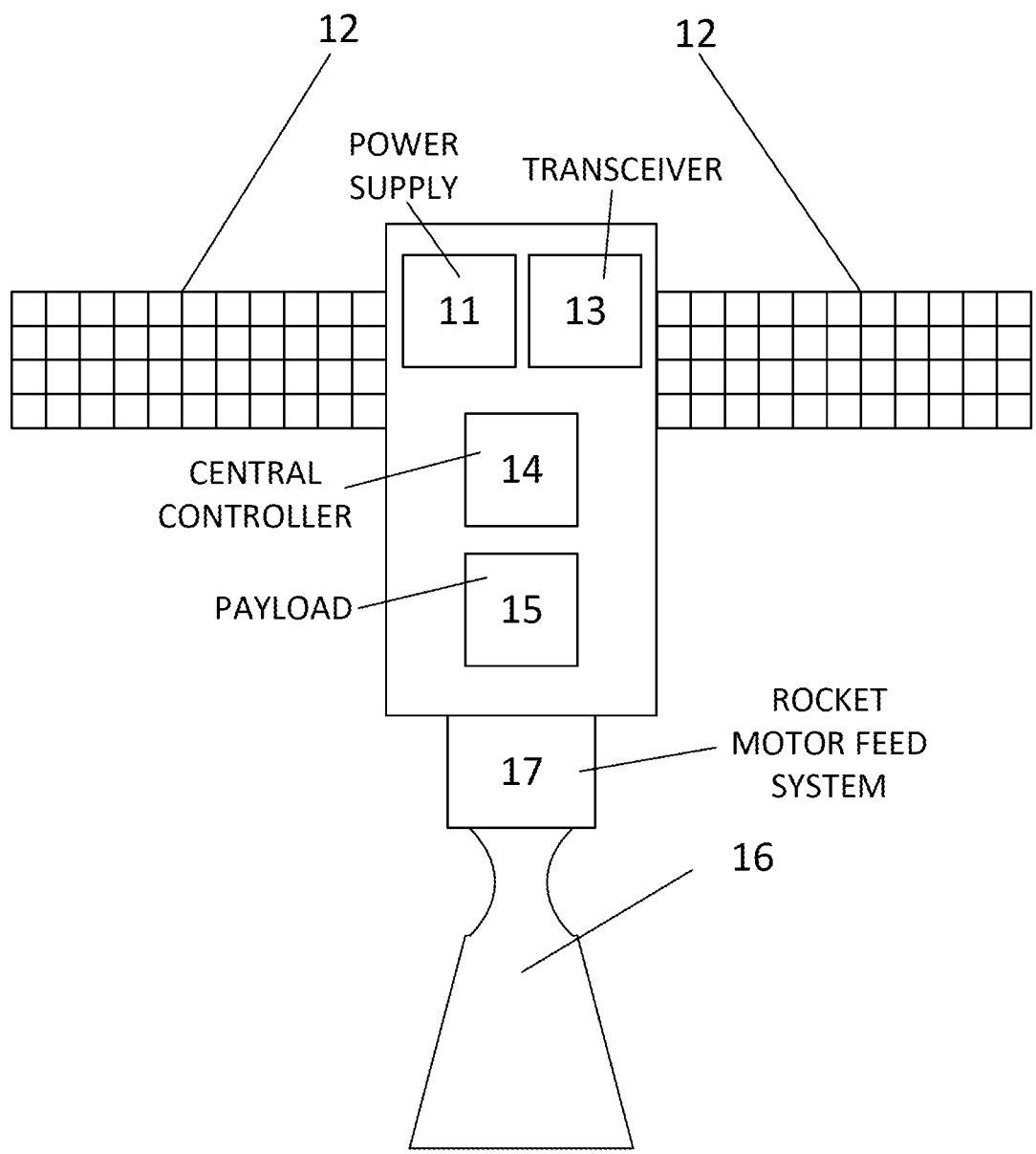
FIG. 1 is a block diagram of a spacecraft.

FIG. 1 depicts a block diagram of an example of a spacecraft, such as a satellite. The spacecraft 10 includes a power supply 11. The power supply 11 stores potential energy and is used to power various components of the spacecraft 10. The power supply 11 may be recharged via an energy supply, such as a solar collector 12.

The spacecraft 10 includes a transceiver 13 and a central controller 14. The spacecraft 10 can communicate with other entities or objects on Earth or in space via transceiver 13. Instructions can be received by transceiver 13 and interpreted by central controller 14, which can then actuate or instruct other components of the spacecraft 10 to perform various operations. The spacecraft 10 may also include a payload 15, which will vary depending on the application of the spacecraft 10.

The spacecraft 10 also includes a rocket motor module 16. The rocket motor module 16 is used to propel the spacecraft 10 and can be used to adjust the orbit or attitude of the spacecraft 10. The rocket motor module 16 includes at least a rocket motor feed system 17.

Figure 2:
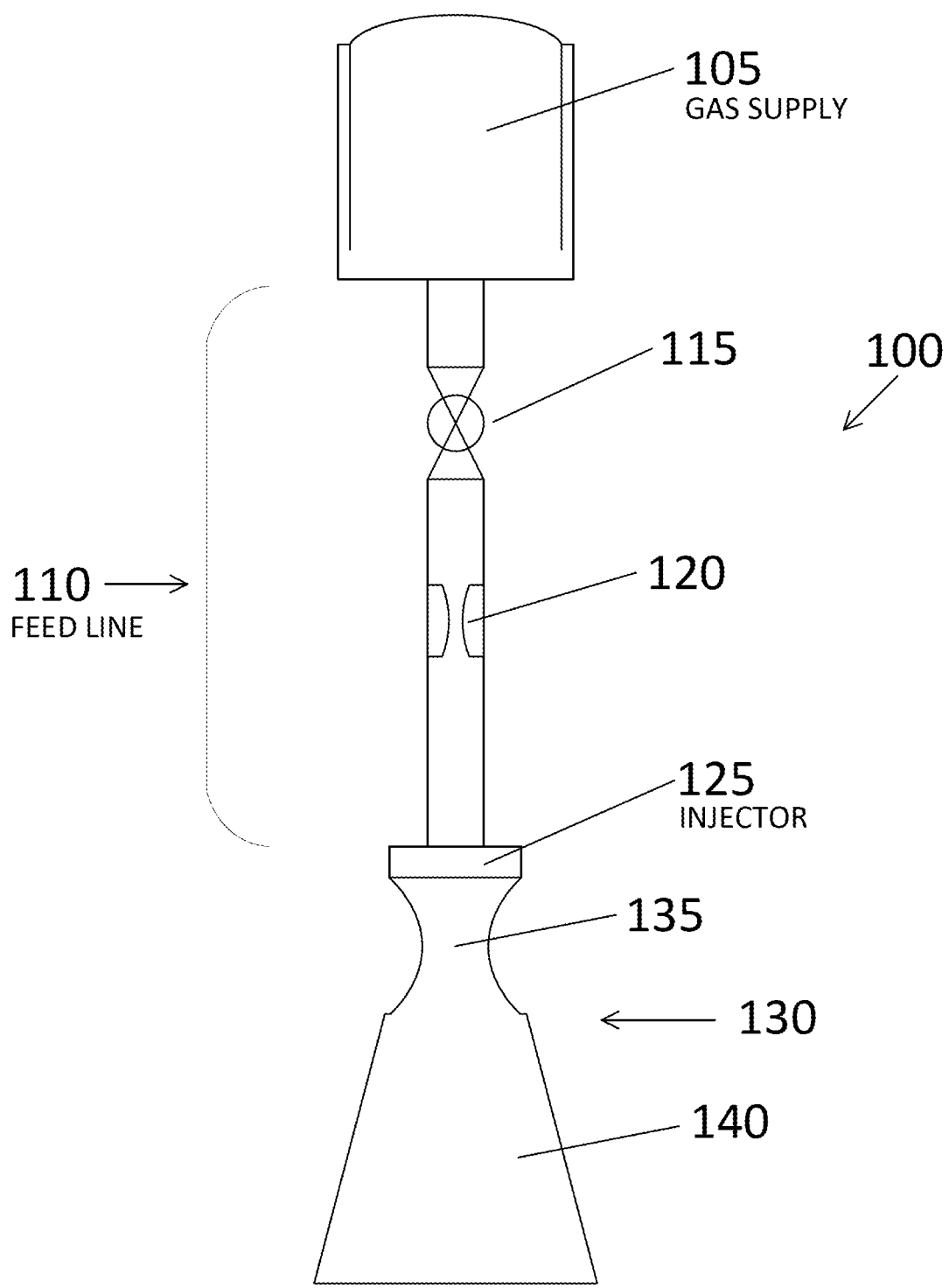
FIG. 2 depicts a rocket motor feed system according to one example.

FIG. 2 depicts an example of a rocket motor feed system 100 of a spacecraft. The rocket motor feed system 100 is used to feed propellant to a rocket motor. The feed system 100 includes at least one gas supply 105 which contains a gas. The gas can be a gaseous propellant.

The gas supply 105 is in fluid communication with a feed line 110 which supplies gas from the gas supply 105. A valve 115 may be provided within the feed line 110 to control the flow of gas from the gas supply 105.

A sonic choke 120 is provided within the feed line 110. The sonic choke 120 defines a sonic flow orifice and is configured (e.g. dimensioned, sized, and/or shaped) to passively regulate the mass flow rate of gas passing through the sonic choke 120.

An injector 125 is also provided within the feed line 110, downstream of the sonic choke 120. The injector 125 is upstream of a combustor 130 and defines one or more orifices (not visible in FIG. 2) which are configured to at least substantially isolate the upstream section of feed line 110 from the downstream combustor 130. Examples of the injector 125 are provided in greater detail below. The combustor can include a combustion chamber 135 and a nozzle 140. Substantially isolating the upstream section of feed line 110 from the combustor 130 prevents pressure oscillations or shockwaves from propagating up the feed line 110, which would otherwise affect performance of the rocket motor feed system 100.

The gas supply 105 contains a propellant. In examples where the rocket motor fed by the rocket motor feed system 100 consumes bipropellants, the propellant within the gas supply 105 may be a fuel or may be an oxidiser. In these examples, the rocket motor feed system 100 can also include a second branch with a second gas supply and second feed line. Examples of these are described in more detail below. In other examples, the rocket motor fed by the rocket motor feed system 100 may consume a single propellant, in which case the gas supply 105 contains a monopropellant.

The propellant stored within the gas supply 105 can be a liquefied gas and can have a liquid phase portion and a vapour phase portion within the gas supply 105. In some examples, the vapour phase portion of the propellant contained within the gas supply 105 can be supplied to the feed line 110 when the valve 115 is open, while the liquid phase portion of the propellant remains in the gas supply 105.

The gas supplied by the gas supply 105 to the feed line 110 can be self-pressurised. In these examples, the gas can be supplied from the gas supply 105 to the feed line 110 without the use of blowdown systems or pumps, and can be supplied to the feed line mainly through the vapour pressure of the vapour phase portion of the propellant within the gas supply 105.

The vapour pressure of the vapour phase portion of the propellant within the gas supply 105 may temporarily drop as the vapour phase portion is supplied to the feed line 110. This drop in vapour pressure can cause the liquid phase portion of the propellant within the gas supply 105 to boil and to replenish the vapour phase portion of the propellant within the gas supply 105. In this way, the vapour phase portion of the propellant within the gas supply 105 can be replaced or replenished over time as gas is supplied to the feed line 110.

The gas supplied by the gas supply 105 to the feed line 110 passes through the sonic choke 120. The sonic choke 120 defines a sonic flow orifice and is configured (e.g. dimensioned, sized, and/or shaped) to passively regulate the mass flow rate of gas passing through the sonic choke 120. The sonic choke 120 is configured to at least substantially establish choked flow or sonic flow conditions across the sonic flow orifice defined by the sonic choke 120. In some examples, the sonic choke 120 can also be integrated with a valve 115.

Sonic flow (or choked flow) is a phenomenon which can occur when a compressible fluid, such as a gas, passes through an orifice. The velocity of a gas passing through an orifice generally increases as the gas passes through the higher-pressure upstream side of the orifice to the lower-pressure downstream side of the orifice. As the velocity of the gas exiting out of the low-pressure downstream side of the orifice approaches the speed of sound, the flow becomes "sonic" or "choked". The velocity of the gas exiting the orifice is at least partially determined by the upstream and downstream gas temperatures, upstream and downstream gas pressures, and characteristics inherent to the gas (such as the specific heat ratio of the gas.)

When sonic flow conditions are achieved, the mass flow rate passing through the orifice is determined (or "choked") by the conditions on the higher-pressure upstream side of the orifice and is decoupled from the conditions on the lower-pressure downstream side of the orifice. So long as sonic flow conditions are maintained across the orifice, pressure fluctuations or perturbations downstream of the orifice will not substantially affect the mass flow rate passing through the orifice.

Furthermore, sonic flow conditions can be substantially (but possibly not completely) established across an orifice. In these situations, the velocity of the gas exiting the orifice is sufficiently close to Mach 1 for the mass flow rate passing through the orifice to be substantially determined by upstream conditions, but can be very weakly dependent on downstream conditions (e.g. decreasing the downstream pressure may very weakly increase the mass flow rate passing through the orifice.)

The sonic choke 120 provided in the feed line 110 defines a sonic flow orifice and is configured (e.g. dimensioned, sized, and/or shaped) to substantially or completely establish sonic flow or choked flow conditions as the gas in the feed line 110 passes through the sonic choke 120. When sonic flow or choked flow is at least substantially established across the sonic choke 120, the mass flow rate of gas passing through the sonic choke 120 is substantially determined by the conditions upstream of the sonic choke 120 and is substantially decoupled from the conditions downstream of the sonic choke 120.

Whether partial or complete sonic flow or choked flow is established across the sonic choke 120 depends at least partially on the difference in pressure between the gas upstream of the sonic choke 120 and the gas downstream of the sonic choke 120. The pressure downstream of the sonic choke 120 can vary during operation of the rocket engine, while the pressure upstream of the sonic choke 120 is primarily determined by the pressure of the gas supplied by the gas supply 105 within the feed line 110. In examples where the gas supplied by the gas supply 105 is a self-pressurised vapour phase portion of propellant, the vapour pressure of the vapour phase portion must be high enough to at least partially establish sonic flow or choked flow conditions across the sonic choke 120.

Although the exact pressure difference required to achieve sonic flow across the sonic choke 120 depends on several factors, including the specific type of gas and how the sonic choke 120 is configured (e.g. dimensioned, sized, and/or shaped), the applicant has found that a pressure drop of 40% is typically enough to ensure that sonic flow is at least substantially established across the sonic choke 120.

In examples where the gas supplied by the gas supply 105 is a self-pressurised vapour phase portion of propellant, the vapour pressure depends on the temperature of the propellant within the gas supply 105 according to the vapour pressure curve of the propellant. The temperature of the propellant or gas within the gas supply 105 can vary during operation of the rocket motor feed system 100.

For example, the temperature can increase due to the conduction of heat from the downstream combustor 130 to the gas supply 105.

Conversely, the process of the liquid phase portion of the propellant partially boiling and replenishing the vapour phase portion of the propellant can extract heat from the gas supply 105, thereby lowering its temperature. The different operating temperatures of the gas supplied by the gas supply 105 therefore need to be taken into account when selecting a suitable propellant to use with the rocket motor feed system 100.

To this end, the applicant has found that propellants with vapour pressures of at least 5 bar across the range of operating temperatures are most suitable for use as self-pressurising propellants for at least partially establishing sonic flow or choked flow conditions across the sonic choke 120. The range of operating temperatures of the self-pressurised propellant typically varies from −10° C. to 35° C.

As a non-limiting example, propene can be used as a self-pressurised gaseous fuel within gas supply 105. Propene has a vapour pressure of approximately 12 bar at room temperature and has a high enough pressure over a large range of operating temperatures to at least partially establish sonic flow or choked flow conditions across sonic choke 120. As a further non-limiting example, nitrous oxide can be used as a self-pressurised gaseous oxidiser within gas supply 105. Nitrous oxide has a vapour pressure of approximately 52 bar at room temperature, which is high enough over a large range of operating temperatures to at least partially establish sonic flow or choked flow conditions across sonic choke 120.

Further suitable self-pressurised gaseous fuels can also include methane, ethane, ethene, propane and hydrazine. However, any gaseous fuel which has a vapour pressure of at least 5 bar across the range of operating temperatures can be most suitable for use as a self-pressurised propellant in the rocket motor feed system 100. Similarly, suitable oxidisers include nitrogen tetroxide and liquefied oxygen, but any gaseous oxidiser which has a vapour pressure of at least 5 bar across the range of operating temperatures can be most suitable for use as a self-pressurised propellant in the rocket motor feed system 100.

Self-pressured propellants with vapour pressures of less than 5 bar across the range of operating temperatures can also be compatible with the present invention, but the use of these propellants may result in low downstream pressures in the rocket motor and may adversely affect the rocket motor's performance. As a result, it is usually advantageous and preferable to use propellants with vapour pressures of at least 5 bar, but this is not a strict limitation.

Similarly, if a potential propellant only has a vapour pressure of at least 5 bar over a narrower range of temperatures, the gas supply 105 can include a temperature regulator to ensure that the temperature of the propellant stays within an acceptable range. For example, the gas supply 105 can include an active heater or cooler which ensures that the temperature of the gas within the gas supply 105 stays within a specified range. Alternatively, the temperature regulator of gas supply 105 can allow the temperature of the gas within the gas supply 105 to fall below a certain point when the rocket motor fed by the rocket motor feed system 100 is not operational, but may warm up the gas within the gas supply 105 to an acceptable temperature/pressure prior to firing the rocket motor.

Figure 3:
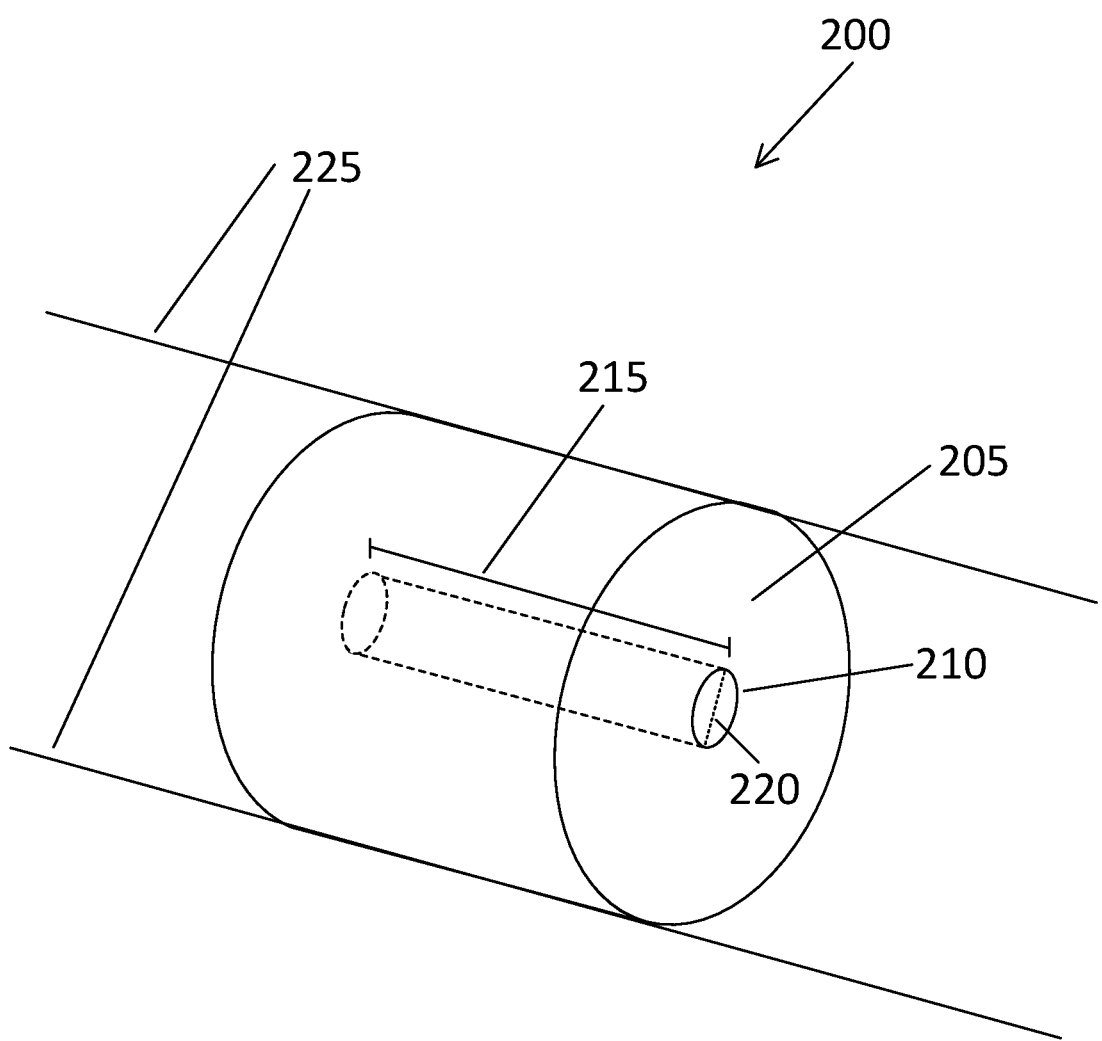
FIG. 3 depicts a sonic choke defining a sonic flow orifice according to one example.

FIG. 3 depicts an example of a sonic choke 200 provided in a feed line. This sonic choke 200 includes a body 205 which defines a sonic flow orifice 210. The sonic choke 200 is disposed in a portion of a feed line indicated by the feed line walls 225. In this non-limiting example, the body 205 of the sonic choke 200 is a plate or disc situated within the feed line and the sonic flow orifice 210 is defined approximately in the centre of the body 205. However, the invention is not limited in this respect, and the body 205 which defines the sonic flow orifice 210 can vary depending on the application of the rocket motor feed system.

For example, the body 205 of the sonic choke 200 which defines the sonic orifice 210 can be one or more protuberances originating from the walls of the feed line 225. These protuberances can be integrally formed with the walls 225 or can be attached or coupled to the walls 225 in some other way. In other examples, a portion of a wall 225 of the feed line can define the sonic flow orifice 210—i.e. the sonic flow orifice 210 can pass through one of the walls 225 and can be tangential or orthogonal to the longitudinal axis of the feed line. In still other examples, the diameter of the feed line (or distance between the walls 225 of the feed line) can narrow at a certain point, and this narrow passage can define the sonic flow orifice 210. The reader will understand that the body 205 of the sonic choke 200 which defines the flow sonic orifice 210 can vary depending on the application of the rocket motor feed system, as long as the body 205 of the sonic choke 200 defines the sonic flow orifice 210 such that the sonic flow orifice 210 is provided in the feed line 200 of the rocket motor feed system.

Furthermore, although the non-limiting example depicted in FIG. 3 shows a single sonic flow orifice 210 defined by the body 205 of the sonic choke 200, the invention is not limited in this respect. One or more bodies 205 can define a plurality of sonic flow orifices 210 depending on the application of the rocket motor feed system.

The body 205 defining the sonic flow orifice 210 is at least substantially formed from a material which is compatible (e.g. substantially non-reactive) with the gas used in conjunction with the sonic flow orifice 210. This typically encompasses a wide range of materials which can include, for example, stainless steel, inconel, aluminium, steel (including carbon steel), titanium, niobium, or any alloys thereof.

The sonic flow orifice 210 has a shape and dimensions that can substantially determine the mass flow rate of a gas (for a given gas type and upstream conditions) and therefore can depend on (or be configured for) the application of the sonic flow orifice 210 and the overall rocket motor feed system.

In the non-limiting example depicted in FIG. 3, the shape of the sonic flow orifice 210 is substantially cylindrical and has an associated diameter 220. However, other examples of the sonic flow orifice 210 may have substantially elliptical shapes (having major and minor axes instead of diameters) or entirely non-circular shapes, depending on the application of the sonic choke 200 and the overall rocket motor feed system. In some examples with cylindrical sonic flow orifices 210, the diameter 220 of the sonic flow orifice 210 may be between 50 microns to 10,000 microns.

The sonic flow orifice 210 also has a length 215 extending through the body 205 of the sonic choke 200. In some examples, the diameter 220 (or equivalent dimension for non-circular orifices) may be substantially constant along the length 215 of the sonic flow orifice 210. In other examples, the diameter 220 (or equivalent dimension for non-circular orifices) can vary along the length 215 of the sonic flow orifice 210. The length 215 may also be expressed in terms of a ratio of the length 215 to the diameter 220 of the sonic flow orifice 210. In some examples, the sonic flow orifice 210 may have a length 215 to diameter 220 ratio within the range of 1 to 10. In particular examples having a constant cylindrical diameter 220, the length:diameter ratio may be about 5.

The shape and dimensions of the sonic flow orifice 210 can also depend on the application of the sonic choke 200 within the rocket motor feed system. The dimensions and/or shape of the sonic flow orifice 210 can at least partially, if not significantly, determine the sonic flow or choked flow conditions for a given propellant. For example, the magnitude of the pressure drop across the sonic flow orifice 210 in order to establish substantial sonic flow or choked flow can be determined by the dimensions and/or shape of the sonic flow orifice 210. The configuration (e.g. dimensions, size, and/or shape) of the sonic flow orifice 210 therefore can depend on the type of gas used within the rocket motor feed system.

Similarly, the mass flow rate dictated by the sonic choke 200 can be at least partially, if not substantially, determined by the dimensions and/or shape of the sonic flow orifice 210, for a given upstream gas having a given temperature and pressure. Selecting the appropriate dimensions and/or shape of the sonic flow orifice 210 will depend on the application of the sonic choke 200.

As a non-limiting example, the sonic choke 200 can be provided in the feed system of a rocket motor of a satellite. The choke 200 can be configured (e.g. dimensioned, sized, and/or shaped) to provide a substantially constant mass flow rate within the ranges of about 0.1 kg/second to 1 kg/second for a given gas, which can be a self-pressurised gaseous propellant such as propene or nitrous oxide.

Conversely, the sonic choke 200 can be used to provide a substantially constant mass flow of a fuel such as propene or an oxidiser such as nitrous oxide, but in the feed system of a rocket motor of a full-sized rocket. In these examples, the mass flow rate of gas will be correspondingly larger given the larger rocket motor.

When sonic flow or choked flow conditions are at least substantially established across the sonic flow orifice 210, the mass flow rate passing through the sonic choke 200 is at least substantially determined by the upstream gas conditions (e.g. the gas temperature and gas pressure) and is substantially independent of the gas conditions downstream of the sonic choke 200. The sonic choke 200 therefore passively regulates the flow rate of mass leaving the gas supply to provide a predictable and substantially constant mass flow rate for a given set of upstream gas conditions, effectively decoupling the mass flow rate from changes or fluctuations in the gas conditions downstream of the sonic choke 200. In examples where the rocket motor feed system is used to feed a bi-propellant rocket motor, this allows the rocket motor feed system to provide a predictable and substantially constant ratio of oxidiser to fuel within the combustor, which can be important for maintaining a high motor efficiency and beneficial for combustor longevity. This also means that the rocket motor can behave more predictably in general.

The sonic choke of the present rocket motor feed system passively regulates the mass flow rate of gas passing through the system without the need for any moving parts or closed loop feedback controls. This can reduce the overall complexity of the rocket motor feed system, which may otherwise rely on upstream pumps or blowdown systems to reactively adjust the mass flow rate of gas or propellant passing through the feed system. Reducing the complexity of the rocket motor feed system can also increase its reliability and longevity as it can be less prone to failure, and can reduce production and manufacturing costs. Furthermore, obviating the need for upstream pumps or blowdown systems can also reduce the overall weight and volume of the rocket motor feed system, which is an important consideration for spacecraft.

Decoupling the mass flow rate of gas passing through the sonic choke from downstream conditions also allows for efficient regenerative cooling systems to be used with the combustor of the rocket motor. Rocket motor feed systems without active or passive mass flow regulation must decouple the temperature of the gas flowing into the injector from the temperature of the engine to ensure a constant mass flow rate regardless of the operational state of the thruster/combustor. This precludes the use of propellants in a regenerative cooling cycle and necessitates other techniques for cooling the combustor, such as film cooling or ablative cooling. However, these techniques can suffer from disadvantages such as lower specific impulse or reduced thruster life.

In comparison, the passive regulation of the mass flow rate achieved by the present invention means that a substantially constant mass flow rate leaves the gas supply and reaches the combustor, regardless of the temperature or pressure of the gas flowing into the injector (provided that sonic flow is at least substantially established across the sonic choke.) This means that the gas flowing through the gas feed system can be used to regeneratively cool the combustor before passing through the downstream injector, without changing the rate of mass flowing through the upstream sonic choke.

Figure 4:
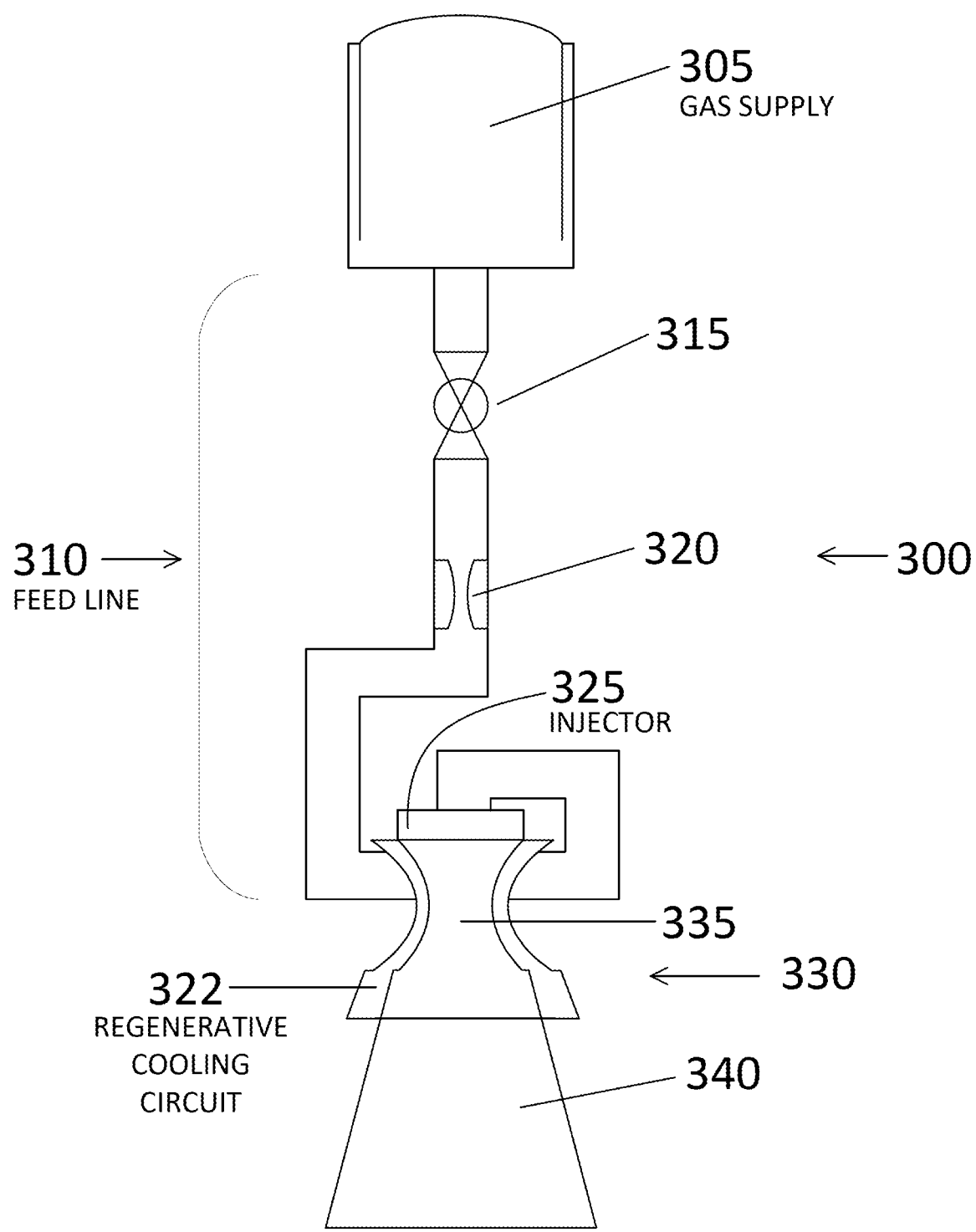
FIG. 4 depicts a rocket motor feed system according to a further example.

FIG. 4 depicts an example of a rocket motor feed system with a regenerative cooling circuit. The rocket motor feed system 300 includes a gas supply 305 connected to a feed line 310. A valve 315 may be situated within the feed line 310 and is used to control the flow of gas from the gas supply 305. A sonic choke 320 is situated downstream of the gas valve 315 in the feed line 310 and is configured (e.g. dimensioned, sized, and/or shaped) to passively regulate the mass flow rate of gas passing therethrough by establishing sonic flow across the sonic choke 320.

A regenerative cooling circuit 322 is provided downstream of the sonic choke 320. The regenerative cooling circuit 322 is in thermal contact with a combustor 330 including one or more of a combustion chamber 335, nozzle 340, and/or injector 325. Gas supplied by the gas supply 305 passes through the feed line 310 and sonic choke 320 before entering the regenerative cooling circuit 322. Heat generated from the combustion of propellant in the combustor 330 is transferred to the regenerative cooling circuit 322 due to the thermal contact between the components, and consequently to the gas passing through the regenerative cooling circuit 322.

The gas consequently passes through the regenerative cooling circuit 322 and through the one or more orifices defined by the injector 325 before being combusted in the combustion chamber 335 and expelled out the nozzle 340. The one or more orifices defined by the injector 325 are configured to at least substantially isolate the upstream feed line 310 from the combustor 330.

Including the regenerative cooling circuit 322 in the rocket motor feed system 300 can allow the combustor 330 to provide a larger amount of thrust than would otherwise be possible without the use of a cooling system, as it is able to burn more propellant per unit time while still remaining at a safe operating temperature. Additionally or alternatively, the use of a regenerative cooling circuit 322 can increase the longevity of the combustor 330, particularly when compared with alternative, non-regenerative cooling methods.

Although the temperature of the gas within the regenerative cooling circuit 322 increases as heat is transferred from the combustor 330, the mass flow rate of gas supplied by the gas supply 305 and passing through the upstream sonic choke 320 is substantially constant for the given upstream gas conditions, provided that sonic flow remains at least substantially established across the sonic choke 320. The mass flow rate of gas entering the one or more orifices defined by the injector 325 is therefore also substantially constant, meaning that the combustor continues to behave in a predictable manner. Furthermore, the ratio of oxidiser to fuel reaching the combustor 330 can also be substantially constant, which can be important for the efficiency and performance of the combustor 330.

In some examples, the regenerative cooling circuit 322 consists of a plurality of helical tubes 3D-printed into the combustor 330. The internal diameter of one or more of the helical tubes can vary along the length of the tube such that the velocity of gas flowing within the tube is varied as required by the local cooling requirements. In other examples, the regenerative cooling circuit 322 can consist of more traditional designs or may be manufactured using more traditional techniques. The overall design of the regenerative cooling circuit 322 can depend on the application of the rocket motor feed system 300 and its associated rocket motor.

More than one rocket motor feed system of the present invention can also be used within a single rocket motor. For example, a single bi-propellant rocket motor can have a fuel branch (e.g. a first rocket motor feed system which feeds fuel to the rocket motor) and an oxidiser branch (e.g. a second rocket motor feed system which feeds oxidiser to the rocket motor.) These branches or rocket motor feed systems can be completely independent of one another or can have components which are shared or common to both branches/rocket motor feed systems. For example, the fuel branch and the oxidiser branch of a bi-propellant rocket motor feed system will typically share a common injector upstream of the combustor, although each propellant will typically flow through different orifices defined by the injector.

Similarly, multiple fuel branches and/or multiple oxidiser branches may be used to feed a single rocket motor. For example, some examples of the rocket motor feed system can include multiple fuel/oxidiser gas supplies with dedicated feed lines or single gas supplies with multiple feed lines. The number and configuration of fuel branches and oxidiser branches can vary depending on the rocket motor feed system and the requirements or configuration of the spacecraft.

Figure 5:
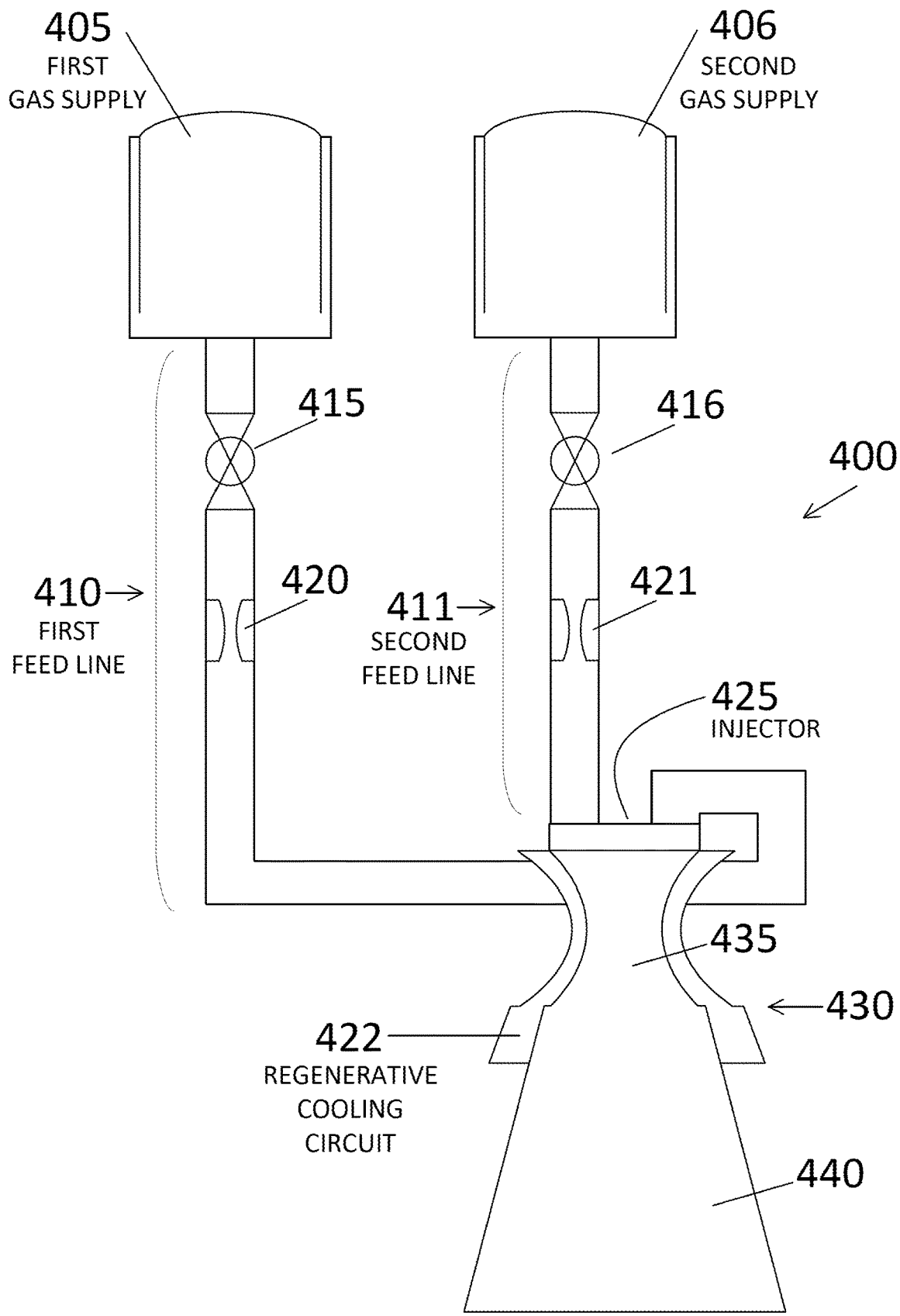
FIG. 5 depicts a rocket motor feed system according to yet another further example.

One possible example of a rocket motor feed system with a fuel branch and an oxidiser branch is shown in FIG. 5. The rocket motor feed system 400 includes a first gas supply 405 and a second gas supply 406. Each gas supply can respectively contain a fuel and an oxidiser. These may be self-pressurised liquified gases with mixtures of liquid phase portions and vapour phase portions within each gas supply.

The two gas supplies 405 and 406 are respectively connected to a first feed line 410 and a second feed line 411. A first valve 415 may be provided within the first feed line 410, while a second valve 416 may be provided within the second feed line 411. A first sonic choke 420 is provided in the first feed line 410, while a second sonic choke 421 is provided within the second feed line 411. Each sonic choke 420 and 421 is configured (e.g. dimensioned, sized, and/or shaped) to passively regulate the mass flow rate of gas passing therethrough.

The first feed line 410 and/or second feed line 411 can also include a regenerative cooling circuit. In the non-limiting example shown in FIG. 5, a regenerative cooling circuit 422 is provided in the first feed line 410, downstream of the first sonic choke 420. In other examples, both feed lines 410 and 411 can include one or more regenerative cooling circuits. In still further examples, neither feed line 410 or 411 may include a regenerative cooling circuit, and regenerative cooling circuits can be absent entirely from the rocket motor feed system 400. Whether and where a regenerative cooling circuit is included in the rocket motor feed system 400 can depend on the application of the rocket motor feed system.

In the non-limiting example shown in FIG. 5, an injector 425 is provided downstream of the regenerative cooling circuit 422 of the first feed line 410 and downstream of the second sonic choke 421 of the second feed line 411. A combustor 430 is also provided downstream of the injector 425 and includes a combustion chamber 335 and a nozzle 440. The injector 425 defines one or more orifices (explained in greater detail below) used to introduce propellants into the combustor 430. The one or more orifices are configured to substantially isolate the upstream section of the first feed line 410 from the downstream combustor 430 and to substantially isolate the upstream section of the second feed line 411 from the downstream combustor 430 (from e.g. pressure fluctuations.) In other words, the orifices defined by the injector 425 are configured to at least substantially decouple the pressure within the combustion chamber 435 from the propellant feed pressure. Fuel and oxidiser supplied by the first and second gas supplies 405 and 406 respectively pass through the orifice(s) defined by the injector 425 before mixing and igniting in the combustion chamber 435. The combusted mixture is then expelled out of the nozzle 440, producing thrust and propelling the spacecraft.

The efficiency and performance of the motor, such as the amount of thrust generated by the motor per unit of propellant burned, can depend at least partially on how the fuel and oxidiser mixes and burns within the combustion chamber 435. To this end, the orifice(s) defined by the injector 425 can also be configured to ensure adequate mixing of the gaseous fuel and gaseous oxidiser supplied respectively by the first gas supply 405 via the first feed line 410 and by the second gas supply 406 via the second feed line 411. The orifices defined by the injector 425 can also at least partially determine the injection velocity of gaseous fuel and gaseous oxidiser into the combustion chamber 435.

In some examples, the injector 425 can include an injection plate which is fed by the first upstream feed line 410 and the second upstream feed line 411. The injection plate can define a first orifice (or plurality of orifices) used to inject a first type of propellant (e.g. fuel) supplied by first gas supply 405 into the combustion chamber 435, and can define a second orifice (or plurality of orifices) used to inject a second type of propellant (e.g. oxidiser) supplied by second gas supply 406 into the combustion chamber 435. The first and second orifice (or orifices) can at least substantially isolate their respective upstream feed lines from the downstream combustor 430 by achieving a sufficient pressure drop across each orifice.

Figure 6A:
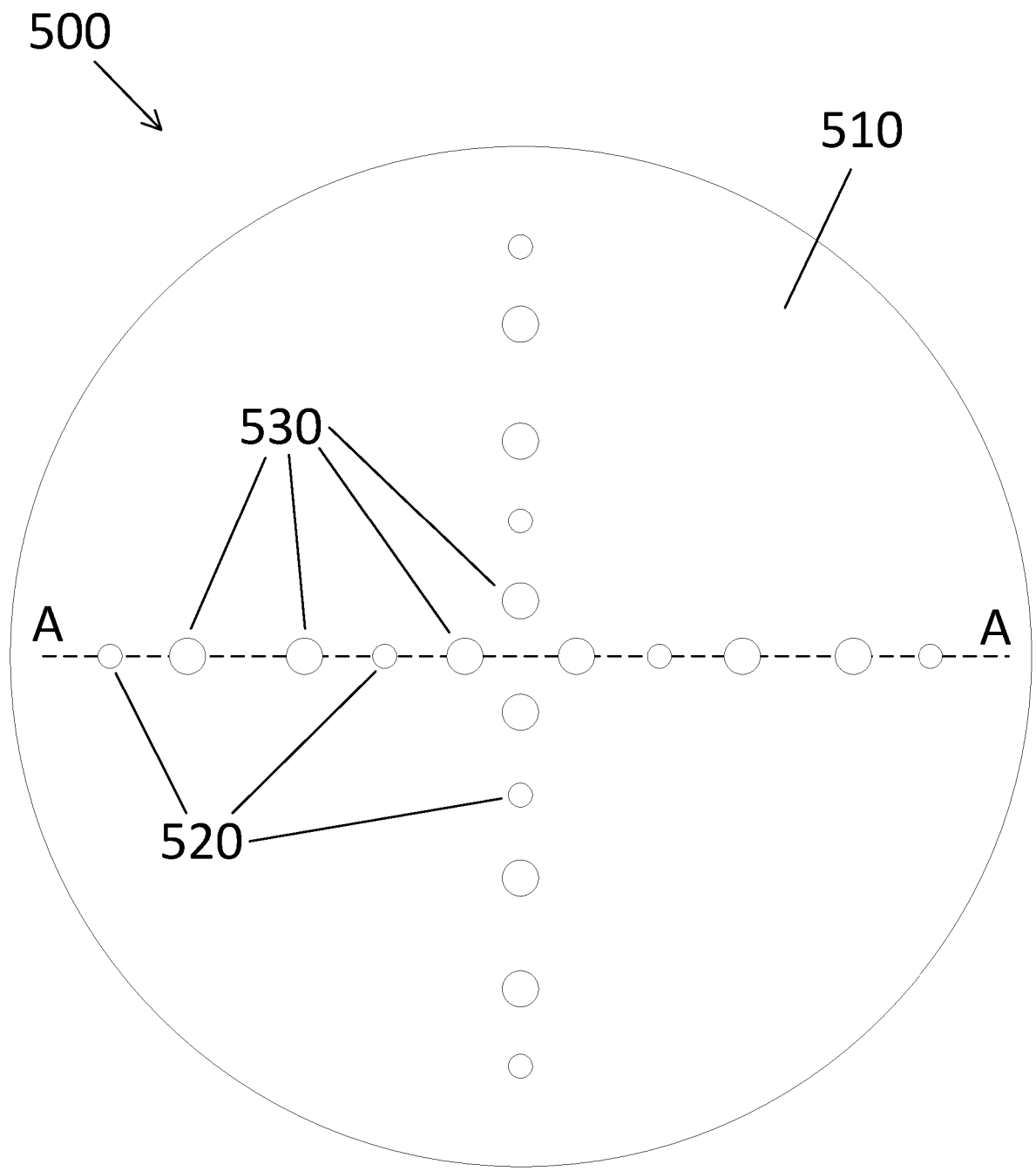
FIG. 6(*a*) depicts an example of an injector.
Figure 6B:
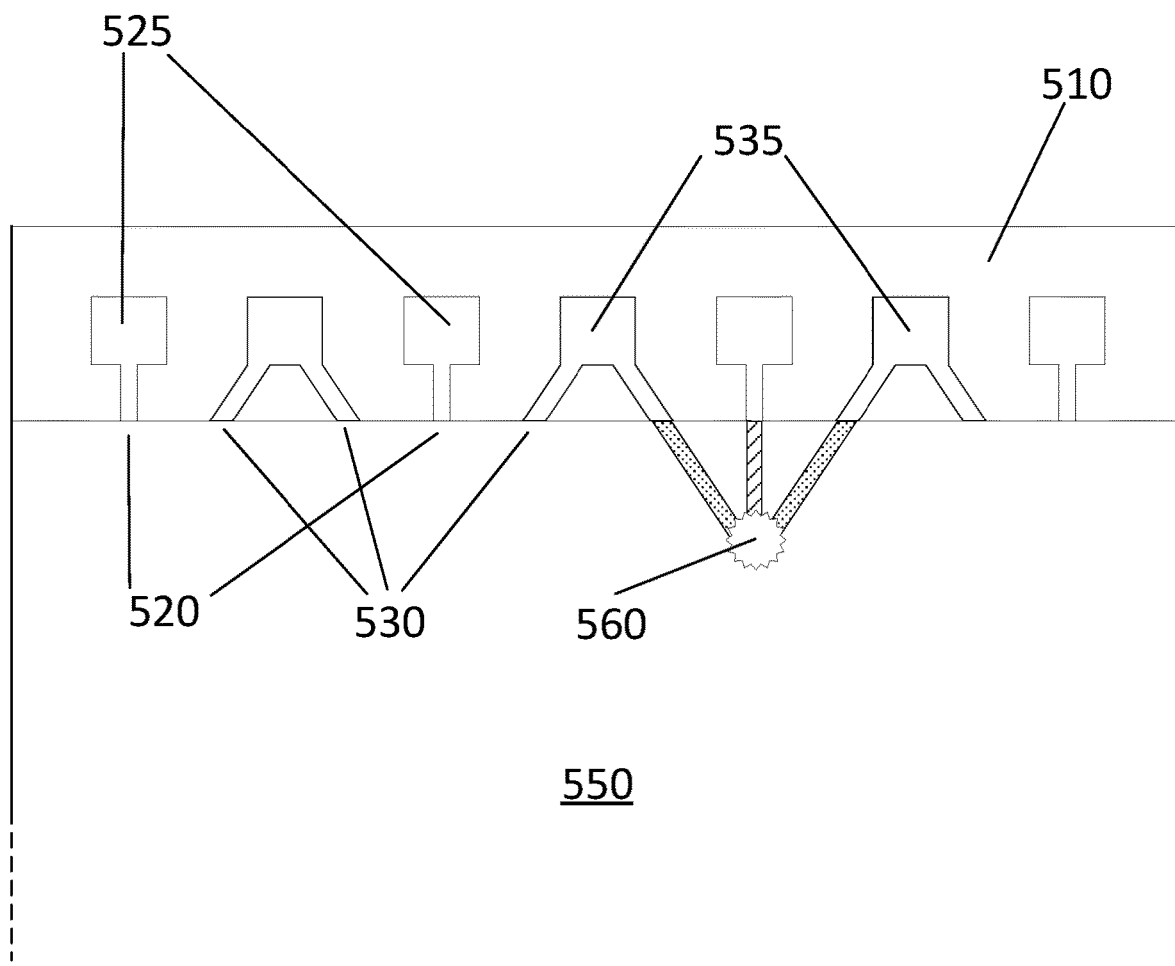

FIG. 6(*a*) depicts a non-limiting example of an injector. The injector 500 includes an injection plate 510 which defines a first plurality of orifices (a portion of which are indicated by 520) and a second plurality of orifices (a portion of which are indicated by 530.) Fuel supplied by a first feed line is injected into the combustor through the first plurality of orifices 520, while oxidiser supplied by a second feed line is injected into the combustor through the second plurality of orifices 530.

FIG. 6(*b*) depicts a cross-section view of example injector through section A-A. In this example, the injection plate 510 defines a first plurality of manifolds 525 and a second plurality of manifolds 535. Fuel supplied by a first upstream feed line (not pictured) to the injector passes through the first plurality of manifolds 525, while oxidiser fed through a second upstream feed line (not pictured) to the injector passes through the second plurality of manifolds 535. Each fuel manifold 525 is in fluid communication with a plurality of orifices 520 used to inject fuel into the combustion chamber (denoted generally by 550), while each oxidiser manifold 535 is in fluid communication with orifices 530 used inject oxidiser into the combustion chamber 550. The fuel orifices 520 are configured to isolate the first upstream feed line from the combustor, while the oxidiser orifices 530 are configured to isolate the second upstream feed line from the combustor. This can be achieved by ensuring a sufficient pressure drop across each respective orifice.

In some examples the fuel orifices 520 and/or the oxidiser orifices 530 may be sonic orifices themselves, although this may require high gas pressures within the fuel and oxidiser manifolds 525 and 535. In most cases, sonic flow across the fuel orifices 520 and/or oxidiser orifices 530 will not be necessary to substantially isolate each respective feed line from the downstream combustor.

The particular non-limiting example of the injector depicted in FIG. 6(*b*) is an unlike triplet impinging injector. In this example, fuel which is injected through the fuel orifices 520 defined by the injection plate 510 impinges upon oxidiser injected through the oxidiser orifices 530 defined by the injection plate 510 at various impingement points—one impingement point 560 is illustrated. However, the injector of the rocket motor feed system is not limited to this particular design, and many other variations could be used with the rocket motor feed system depending on its application. For example, other injectors may be coaxial and may be, for example, a pintle injector, a shear coaxial injector, a central body coaxial injector, or a shear tri-coaxial injector.

In still other examples, the injector may be an impinging injector of a different design (including like and unlike impinging injectors, doublet impinging injectors, etc), a showerhead injector, or anything with a defined orifice. In still further examples, the injector could be a porous injector, and the orifices used to inject oxidiser and/or fuel can be defined by the porous media of the injector.

The design of the injector can depend on its application and other factors including (for example) the size of the motor, the types of propellants used in the rocket motor feed system, the required injection velocity of the propellants, and the required rates of propellant masses flowing into the combustor.

The efficiency and performance of the rocket motor can also depend on the ratio of oxidiser to fuel being burned within the combustion chamber. With reference to FIG. 5, the oxidiser:fuel ratio reaching the combustion chamber 435 is at least partially determined by the first and second sonic chokes 420 and 421, as the first and second sonic chokes 420 and 421 passively regulate the mass flow rate of fuel and oxidiser within the first and second feed lines 410 and 411. The first and second sonic chokes 420 and 421 can therefore be configured to provide a target ratio of oxidiser:fuel to the combustion chamber 435 and/or a ratio within a preferred range. For example, the shape and/or dimensions and/or size of the first and second sonic chokes 420 and 421 (and the sonic flow orifices defined thereby) can be chosen to deliver a target ratio of oxidiser:fuel flowing into the combustion chamber 435.

The ideal oxidiser:fuel ratio will typically depend on the specific propellants used with the motor. The first and second sonic chokes 420 and 421 will typically be configured (e.g. dimensioned, sized, and/or shaped) to provide an oxidiser:fuel ratio on the order of 0.5:1 to 20:1, depending on the applications of the motor and the propellants used with the rocket motor feed system. In examples where nitrous oxide and propene are used respectively as an oxidiser and fuel, the ideal ratio is approximately 8:1 oxidiser:fuel.

The actual mass flow rate of gaseous oxidiser or fuel passing through each sonic choke 420 and 421 depends not only on how each sonic choke (or sonic orifice defined thereby) is configured (e.g. dimensioned, sized, and/or shaped), but also on the type of gas and the upstream gas conditions, such as temperature and pressure. In examples where the gaseous propellants supplied by gas supplies 405 and 406 are vapour phase portions of self-pressurised liquefied gases, the pressure and temperature of each gaseous propellant are related by the propellant's vapour pressure curve. Generally speaking, for a sonic choke with a given configuration, the mass flow rate of a gaseous propellant at 35° C. may be 100% of a relative mass flow rate, while the mass flow rate of the same gaseous propellant at −10° C. may be 35% of the relative mass flow rate.

In some examples, the propellants can be selected based on their vapour pressure curves such that the ratio of the mass flow rate through the sonic choke 420 of the oxidiser branch to the mass flow rate through the sonic choke 421 of the fuel branch does not substantially change over the range of operating temperatures of the rocket motor feed system 400. This concept will be explained in more depth below.

For a given self-pressurised propellant, the rate of mass flowing through a sonic choke (or sonic flow orifice defined by a sonic choke) has an approximately linear dependence on the upstream propellant temperature. Furthermore, the upstream propellant temperature is related to the temperature of the propellant vapour by the propellant's vapour pressure curve.

If the rocket motor feed system is configured to provide oxidiser and fuel to the combustor at a known ratio at a specific propellant temperature, the ratio of oxidiser:fuel supplied by the rocket motor feed system at a given propellant temperature can be approximated by considering the ratio of each propellant's pressure at that given temperature, due to the approximately linear relationship between mass flow rate and upstream propellant pressure.

For the sake of clarity, let $\dot{m}_O(T)$ be the mass flow rate of oxidiser at temperature T (measured in degrees Celsius) passing through a sonic choke provided in an oxidiser branch, and $\dot{m}_F(T)$ be the mass flow rate of fuel at temperature T passing through a sonic choke provided in a fuel branch. Furthermore, let the oxidiser pressure at temperature T be denoted as $P_O(T)$, and likewise let the fuel pressure at temperature T be denoted as $P_F(T)$—these relationships describe the vapour pressure curves for the oxidiser and fuel, respectively.

Because the rate of propellant mass flowing through each sonic choke depends approximately linearly on the propellant pressure, we can say that:

$$\dot{m}_O(T) \propto P_O(T)$$

$$\dot{m}_F(T) \propto P_F(T)$$

This means that the ratio of mass flow rates of a propellant at two different temperatures, $T_1$ and $T_2$, is approximately equal to the ratio of the propellant pressures at those two temperatures. More explicitly:

$$\frac{\dot{m}_O(T_1)}{\dot{m}_O(T_2)} \approx \frac{P_O(T_1)}{P_O(T_2)}$$

$$\frac{\dot{m}_F(T_1)}{\dot{m}_F(T_2)} \approx \frac{P_F(T_1)}{P_F(T_2)}$$

It follows that if the oxidiser/fuel vapour pressures and the ratio of oxidiser:fuel mass flow rates is known for a specific temperature $T_1$, the ratio of the oxidiser:fuel mass flow rates can be determined for a different temperature $T_2$ by considering the pressures of the oxidiser/fuel at $T_2$.

As a non-limiting illustration of this concept, a rocket motor feed system can use self-pressurised propene vapour as a fuel and self-pressurised nitrous oxide vapour as an oxidiser. The sonic choke of the oxidiser branch and sonic choke of the fuel branch can each be configured (e.g. dimensioned, sized, and/or shaped) such that when both propellants are 0° C., the mass flow rate of oxidiser and mass flow rate of fuel is supplied to the combustor at an 8:1 ratio oxidiser:fuel ratio (or in other words, $\dot{m}_O(0°):\dot{m}_F(0°)$ is 8:1). Propene vapour has an approximate pressure of 5.84 bar at 0° C. according to its vapour pressure curve (i.e. $P_F(0°)$ =5.84 bar), while nitrous oxide vapour has an approximate pressure of 31.22 bar at 0° C. according to its vapour pressure curve (i.e. $P_O(0°)$=31.22 bar.)

If the temperature of each propellant increases to 20° C., the pressure of the propene vapour will increase to approximately 10.17 bar ($P_F(20°)$=10.17 bar) while the pressure of the nitrous oxide vapour will increase to approximately 50.53 bar ($P_O(20°)$=50.53 bar) according to each propellant's pressure vapour curve, and the new mass flow rates will correspondingly increase:

$$\frac{\dot{m}_O(20° \text{ C.})}{\dot{m}_O(0° \text{ C.})} \approx \frac{50.53}{31.22} \Rightarrow \dot{m}_O(20° \text{ C.}) \approx 1.619 \cdot \dot{m}_O(0° \text{ C.})$$

$$\frac{\dot{m}_F(20° \text{ C.})}{\dot{m}_F(0° \text{ C.})} \approx \frac{10.17}{5.84} \Rightarrow \dot{m}_F(20° \text{ C.}) \approx 1.741 \cdot \dot{m}_F(0° \text{ C.})$$

The new ratio of oxidiser:fuel mass flow rates can then be calculated:

$$\frac{\dot{m}_O(20° \text{ C.})}{\dot{m}_F(20° \text{ C.})} \approx \frac{1.619 \cdot \dot{m}_O(0° \text{ C.})}{1.741 \cdot \dot{m}_F(0° \text{ C.})} = \frac{1.619}{1.741} \cdot \left(\frac{8}{1}\right) = 0.93 \cdot \left(\frac{8}{1}\right)$$

In this particular example, the new ratio of oxidiser:fuel mass flow rates at 20° C. is approximately 7.44:1, a decrease of approximately 7% from the 8:1 ratio at 0° C.

This particular example demonstrates how the absolute mass flow rates of each propellant can vary over the range of operating temperatures while still maintaining a relatively stable oxidiser:fuel ratio. However, propellants other than propene or nitrous oxide may also be used to achieve similar results, and the invention is not limited in this respect. Furthermore, the choice of an 8:1 oxidiser:fuel ratio at 0° C. is ultimately arbitrary and will depend on the propellants used with the rocket motor feed system and its requirements.

Furthermore, the above example approximates a linear relationship between the mass flow rate and propellant temperature/pressure. It should be noted that this is an approximation to a first order and the pressure/temperature values provided above are not exact. This example merely illustrates the principle of how a target ratio of oxidiser:fuel may be provided (with some acceptable variation) by the rocket motor feed system. It is fully expected that there may be some non-linear component to the relationship between the mass flow rate and pressure, and the present invention is not tied to the assumption that the aforementioned relationship is entirely linear.

The extent to which the ratio of oxidiser:fuel mass flow rates is allowed to vary or deviate from a certain value ultimately depends on the application and requirements of the rocket motor feed system. Some applications of the rocket motor feed system can require the ratio of the oxidiser:fuel mass flow rates to stay within a comparatively narrow range of values, and the configuration or operating parameters of the rocket motor feed system may vary accordingly. For example, the rocket motor feed system may only be allowed to operate within a correspondingly narrow range of propellant temperatures in order to substantially preserve the ideal ratio of oxidiser:fuel mass flow rates. In other applications, the exact ratio of oxidiser:fuel mass flow rates may be of less importance and the range of acceptable operating temperatures of each propellant, or the choice of propellants themselves, may also vary accordingly.

The example given above also presumes that the temperature of both propellants changes more or less concomitantly. This may a sensible approximation in some examples as the temperatures of the gas supplies of the rocket motor feed system may vary in more or less the same way. For example, although the mass flow rate of oxidiser leaving the oxidiser gas supply 405 is often greater than the mass flow rate of fuel leaving the fuel gas supply 406 (for oxidiser:fuel ratios >1), the total mass of propellant contained within the oxidiser gas supply 405 can be comparatively larger. Because a rocket motor feed system is often designed to exhaust (as in completely consume/deplete) both propellants at the same time in (so the rocket motor feed system isn't left with a surplus of only one propellant), the ratio of mass leaving each gas supply to the total mass contained within that gas supply can be substantially the same for each gas supply of the rocket motor feed system. This can mean that the temperature effects of e.g. evaporative cooling of each gas due to the boiling of liquid phase propellant to vapour phase propellant will affect the temperature of the gas supplies of the rocket motor feed system in more or less the same way.

In some examples, it can be desirable to introduce additional measures to try and keep the temperature of both gas supplies more or less the same. To this end, the first and second gas supplies 405 and 406 can be in thermal contact with one another. For example, the first and second gas supplies 405 and 406 can share a bulkhead and can have one or more metal components (e.g. sidewalls) in common. If a discrepancy in the gas supply temperatures does arise, the thermal contact between the first and second gas supply 405 and 406 will mean the two gas supplies naturally tend towards thermal equilibrium. The first and second gas supplies 405 and 406 can also be in thermal contact with the body of the spacecraft (e.g. satellite), which may equalise any thermal discrepancies more quickly due to the larger thermal mass.

In some examples, the temperatures of the first and second gas supplies 405 and 406 may be actively monitored and controlled. As a non-limiting example, each gas supply may have a thermometer or temperature sensor and a heating element. The temperature sensor associated with each gas supply can interface with a controller which controls the respective heating element to maintain the gas supplies at the same temperature.

In other examples, the rocket motor feed system can be configured to provide a particular ratio of oxidiser:fuel by actively controlling the temperature of one or more of the gas supplies. As a non-limiting example, a central controller on the spacecraft can include a lookup table stored in a form of memory. The lookup table can contain the vapour pressure curve of one or more of the on-board gas supplies. Each gas supply can include a thermometer or temperature sensor and a heating and/or cooling element in communication with the controller. The controller can actively monitor and control the temperature of the one or more gas supplies with reference to the vapour pressure curve of the one or more gas supplies stored within the controller's memory. The temperature of each gas supply can be controlled independently and may differ in order for the rocket motor feed system to deliver the specified oxidiser:fuel ratio to the combustor.

In still other examples or applications of the rocket motor feed system where the oxidiser:fuel ratio supplied to the combustor is not critical, the temperatures of the one or more gas supplies can be allowed to vary. In some applications, it may not be practical to maintain a similar temperature between the one or more gas supplies of the rocket motor feed system without some form of active control. For example, the rocket motor feed system could be used on board an orbiting satellite. One side of the satellite may be more or less constantly illuminated by the sun, while the other side of the satellite may be more or less constantly in the shade. If one of the gas supplies is contained within the illuminated side while another gas supply is contained within the shaded side, a temperature gradient may exist between the two gas supplies even if they are in thermal contact with one another. If the oxidiser:fuel ratio supplied by the rocket motor feed system to the combustor is important, an active control system (as described above) may be employed. Otherwise, the temperatures of the gas supplies may be allowed to vary.

In yet another examples, the motor of the rocket motor feed system can be restricted to performing small burns with small propellant flow rates. In these examples, the mass flow rate of propellant leaving each gas supply can be small enough to cause quasi-static gas supply conditions, meaning the pressure and temperature of propellant within each gas supply does not appreciably change during the operation of the combustor. Similarly, the combustor of the motor may not combust a large enough amount of propellant at any one time to appreciably increase the temperature of either gas supply through conduction. Alternatively, the small temperature decrease through the expansion of gaseous propellant out of each gas supply may be offset by a small temperature increase through heat conduction via the combustor, thereby achieving substantially quasi-static upstream gas conditions (e.g. gas temperature and pressure.)

While the present invention has been illustrated by the description of the examples thereof, and while the examples have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A rocket motor feed system comprising:
   a feed line supplying a gaseous propellant from a gaseous propellant supply;
   a sonic choke provided in the feed line, the sonic choke being configured to passively regulate the mass flow rate of the gaseous propellant passing therethrough; and
   an injector provided in the feed line, the injector being downstream of the sonic choke wherein;
   the injector comprises an injection plate defining a plurality of orifices for injecting the gaseous propellant into a downstream combustor;
   the injector is configured to at least substantially isolate a section of the feed line that is upstream of the injector from the downstream combustor; and
   the gaseous propellant supplied from the gaseous propellant supply is a fuel.

2. The rocket motor feed system of claim 1, wherein the gaseous propellant supplied from the gaseous propellant supply is propene, propane, methane, ethane, ethene or hydrazine.

3. The rocket motor feed system of claim 1, wherein the gaseous propellant supplied from the gaseous propellant supply is self-pressurised.

4. The rocket motor feed system of claim 1, wherein the gaseous propellant supplied from the gaseous propellant supply is the vapour phase of a liquefied gas.

5. The rocket motor feed system of claim 1, wherein the gaseous propellant supplied from the gaseous propellant supply has a pressure of at least 5 bar across a range of operating temperatures.

6. The rocket motor feed system of claim 5, wherein the range of operating temperatures includes $-10°$ ° C. to $35°$ C.

7. The rocket motor feed system of claim 1, wherein the sonic choke defines a cylindrical orifice.

8. The rocket motor feed system of claim 7, wherein the cylindrical orifice defined by the sonic choke has a diameter of 50 to 10000 microns.

9. The rocket motor feed system of claim 7, wherein the cylindrical orifice defined by the sonic choke has a length:diameter ratio of 1 to 10.

10. The rocket motor feed system of claim 1, wherein the sonic choke is configured to provide a mass flow rate of 0.1-1 kilogram/second.

11. The rocket motor feed system of claim 1, wherein the rocket motor feed system includes a regenerative cooling circuit.

12. The rocket motor feed system of claim 1, wherein the rocket motor feed system further includes:
   a second feed line supplying a gaseous propellant from a second gaseous propellant supply;
   a second sonic choke provided in the second feed line, the second sonic choke being configured to passively regulate the mass flow rate of gaseous propellant passing therethrough; and wherein the injector is configured to at least substantially isolate a section of the second feed line that is upstream of the injector from the downstream combustor.

13. The rocket motor feed system of claim 12, wherein the first feed line is a fuel branch and the second feed line is an oxidiser branch.

14. The rocket motor feed system of claim 12, further including a regenerative cooling circuit provided in the first feed line and/or the second feed line.

15. The rocket motor feed system of claim 12, wherein the rocket motor feed system is configured to provide an oxidiser:fuel ratio between 0.5 to 20.

* * * * *